(12) United States Patent
Huber et al.

(10) Patent No.: US 9,114,983 B2
(45) Date of Patent: Aug. 25, 2015

(54) HARDENING ACCELERATORS

(75) Inventors: Adalbert Huber, Behsheim (DE); Marc Entenmann, Fellbach (DE); Alfred Hennemann, Brombachtal (DE); Matthias Koch, Wiesbaden (DE)

(73) Assignee: MERCK PATENT GMBH, Darmstadt (DE)

( * ) Notice: Subject to any disclaimer, the term of this patent is extended or adjusted under 35 U.S.C. 154(b) by 1611 days.

(21) Appl. No.: 11/573,514

(22) PCT Filed: Aug. 8, 2005

(86) PCT No.: PCT/EP2005/008565
§ 371 (c)(1),
(2), (4) Date: Jun. 14, 2009

(87) PCT Pub. No.: WO2006/018169
PCT Pub. Date: Feb. 23, 2006

(65) Prior Publication Data
US 2009/0288581 A1  Nov. 26, 2009

(30) Foreign Application Priority Data

Aug. 12, 2004  (DE) .................. 10 2004 039 358

(51) Int. Cl.
*C09D 7/12* (2006.01)
*C09D 11/00* (2014.01)
*B82Y 30/00* (2011.01)
*C08K 3/00* (2006.01)
*C08K 3/22* (2006.01)
*C09D 11/03* (2014.01)

(52) U.S. Cl.
CPC .............. *B82Y 30/00* (2013.01); *C08K 3/0008* (2013.01); *C08K 3/22* (2013.01); *C09D 7/1216* (2013.01); *C09D 7/1275* (2013.01); *C09D 7/1283* (2013.01); *C09D 11/03* (2013.01); *C08K 2201/011* (2013.01)

(58) Field of Classification Search
USPC ............ 252/500, 518.1, 519.1, 519.5, 520.1; 106/31.92, 287.11, 287.12, 286.4, 106/286.2, 441, 445; 428/323, 328, 329, 428/331, 426, 518
See application file for complete search history.

(56) References Cited

U.S. PATENT DOCUMENTS

| | | | | |
|---|---|---|---|---|
| 5,071,800 A | * | 12/1991 | Iwamoto et al. | 501/126 |
| 5,296,168 A | * | 3/1994 | Jacobson | 428/403 |
| 5,484,694 A | * | 1/1996 | Lelental et al. | 430/530 |
| 5,518,810 A | * | 5/1996 | Nishihara et al. | 428/328 |
| 5,858,077 A | * | 1/1999 | Kayanoki | 106/287.11 |
| 6,051,166 A | * | 4/2000 | Fujiwara et al. | 252/520.1 |
| 6,162,374 A | | 12/2000 | Schoen et al. | |
| 6,409,815 B1 | | 6/2002 | Hennemann et al. | |
| 2003/0180551 A1 | * | 9/2003 | Lin | 428/447 |

FOREIGN PATENT DOCUMENTS

DE  10261541 A1  7/2004
JP  06-184470  *  7/1994  ............... C09D 5/24

* cited by examiner

*Primary Examiner* — Colleen Dunn
(74) *Attorney, Agent, or Firm* — Millen, White, Zelano, Branigan, P.C.

(57) ABSTRACT

The present invention relates to nanoparticulate hardening accelerators, to preparations prepared therefrom, in particular masterbatches comprising nanoparticles, and to the use thereof in polymer matrices, in particular surface coatings and printing inks of all types, which make extremely high demands of color neutrality and/or transparency.

26 Claims, 1 Drawing Sheet

Comparison of the absorption of varnishes (V) prepared with different nanoparticles (0.5%)

Figure 1: Comparison of the absorption of varnishes (V) prepared with different nanoparticles (0.5%)
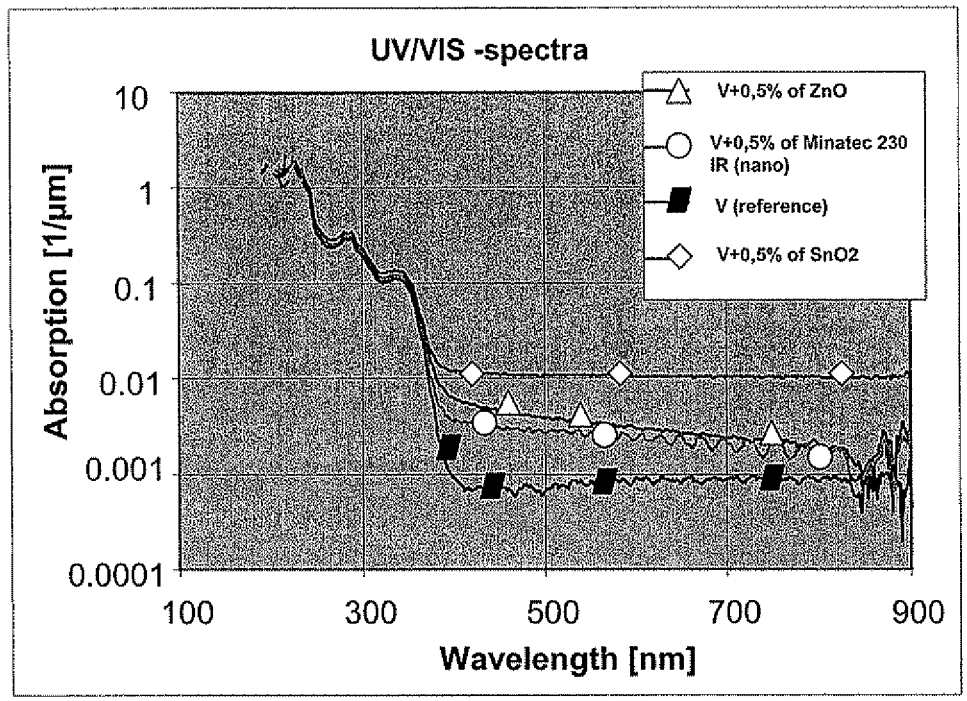
Figure 2: Heating behaviour of the various powder coatings according to Example 4 under the influence of IR irradiation
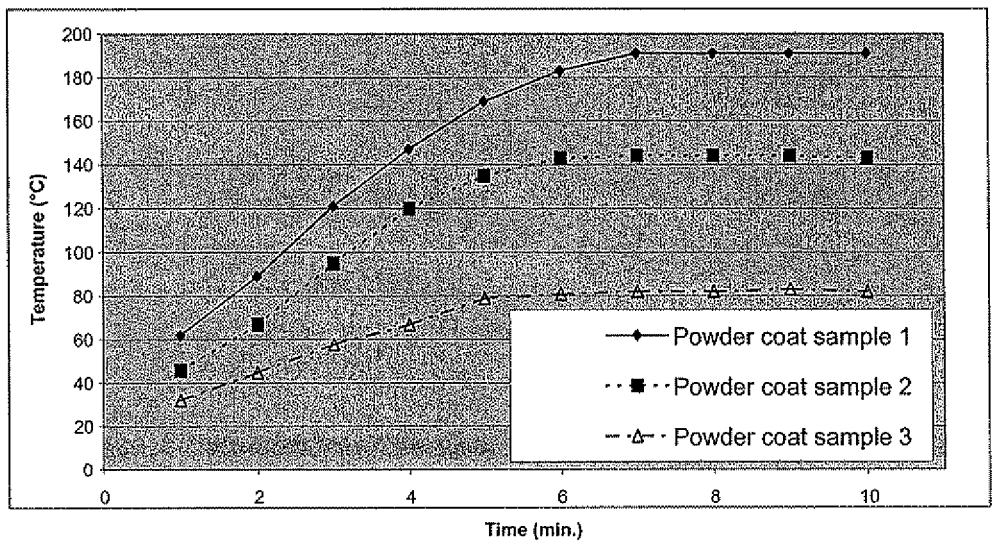

HARDENING ACCELERATORS

The present invention relates to nanoparticulate hardening accelerators, to preparations prepared therefrom, in particular masterbatches comprising nanoparticles, and to the use thereof in polymer matrices, in particular surface coatings and printing inks of all types, which make extremely high demands of colour neutrality and/or transparency.

Nanoparticulate, doped compounds, in particular doping of tin oxides with antimony and/or indium, play a part in many applications where the excellent physical properties, such as electrical conductivity, thermal conductivity, absorption of long-wave and very short-wave radiation, have to be combined with transparency and colour neutrality in the visual light region at low use concentration.

However, the crucial factor in the extent to which these properties come into effect in the particular matrix is the actual separation of the particles as nanoparticles in the active matrix. This separation is essentially dependent on the nature of the surface of the nanoparticles since this determines the interaction, wetting, flocculation stability and thus the efficacy in the use matrix. This surface must be generated as early as during production of the nanoparticles and is thus dependent on the production process. In the case of nanoparticles, the material structure, the doping, the inclusion of impurities are consequently essentially a question of the production process.

In the commonest methods for the production of doped tin oxide nanoparticles, the nanoparticle is produced either by solvolysis processes or by electrochemical methods. The surface of the particles is modified in situ here and the particle is thus stabilised and matched to the use matrix. However, it is disadvantageous in that it cannot be entirely excluded in these processes that in some cases inclusions of these surface modification agents in the nanoparticles themselves or incompatibility with the matrix occur. This frequently reduces the usability of the doped nanoparticles, in particular based on tin oxide, produced in this way. Furthermore, these processes are often difficult to scale up and are not economical for the quantities required in the surface-coatings sector.

The object of the present invention is to provide nanoparticulate semiconductor materials which do not have the above-mentioned disadvantages.

Surprisingly, it has now been found that the surface of nanoparticulate semiconductor materials can be favourably influenced if relatively coarsely particulate precursors are used as the basis for the production of nanoparticles. Advantages which may be mentioned in particular are the high surface purity that can be achieved, in particular if the nanoparticles are not stabilised as usual with dispersion additives, but instead electrostatically in aqueous media via the setting of a sufficiently high zeta potential. The zeta potential is preferably ≥30 mV, in particular ≥60 mV.

The present invention thus relates to nanoparticulate semiconductor materials prepared by grinding coarsely particulate precursors, in the particle size range from 0.1 to 50 μm, in an aqueous medium at a pH of 6-11.

The nanoparticles produced in this manner are distinguished by high purity, the absence of foreign matter and high absorption in the IR region.

The invention furthermore relates to the use of the nanoparticulate semiconductor materials according to the invention for IR hardening of polymer matrices, in particular from the area of surface coatings and printing inks, and to the use of the nanoparticulate semiconductor materials in polymer masterbatches and polymer preparations.

Suitable precursors having particle sizes of from 0.1 to 50 μm, preferably from 0.5 to 20 μm and in particular from 1 to 10 μm, are comminuted using mechanical energy in aqueous media, preferably water or water-miscible organic solvents, such as, for example, methanol, ethanol, diols, triols, at a pH of 6-11. Semiconductor materials prepared in this way are distinguished by the fact that they are very stable and have a very pure surface and composition. Nanoparticles produced in this way can be dried after grinding or are added in solution to the aqueous use systems. It is also possible to add additives, in particular thickeners, wetting agents, dispersion assistants and other additives, before, during or after the grinding process in order thus to increase the compatibility with various matrices. The additives can be polymeric, oligomeric and monomeric additives. These preparations consisting of nanoparticles, additives and optionally water or a water/solvent mixture can thus be either solid or liquid compositions.

The present invention also relates to preparations comprising nanoparticles, additives and optionally water or a water/solvent mixture. These preparations can be used, for example, in matrix polymers, such as, for example, polymer masterbatches, and in polymer preparations.

On incorporation of the nanoparticles into non-aqueous systems, the nanoparticles are firstly freed from the aqueous medium, for example by drying or slow evaporation using strong mechanical shear. The dry or dried nanoparticles are subsequently incorporated into a matrix polymer melt using high shear energies. Addition of assistants which simplify homogeneous incorporation of the nanoparticles into the polymer melt, for example amphiphilic nonionic copolymers, such as, for example, polyether-based polymer systems, often simplify the transfer of the nanoparticles into the corresponding melt of the matrix polymer.

The electrostatically stabilised, aqueous dispersion can often be incorporated directly into the polymer melt using an extruder through the action of high shear forces. Additives can optionally be added. In this way, masterbatches or polymer preparations which comprise the nanoparticles according to the invention in concentrations of up to 30%, preferably 1-30%, in particular 5-10%, are prepared. They can then be employed in powder varnish systems in which the active concentration is about 0.3-0.8% of nanoparticles, based on solid polymer. The varnish systems produced in this way exhibit significantly increased heating rates on IR irradiation.

Suitable pale and transparent semiconductor materials as IR hardening accelerators are, in particular, indium(III) oxide, tin, tin(IV) oxide, zinc oxide, antimony and mixtures thereof. Very particular preference is given to tin oxide.

Particularly preferred IR hardening accelerators are tin(IV) oxide, antimony(III) oxide, indium tin oxide (ITO) or antimony(III) oxide and mixtures thereof. In particular, doped tin oxides additionally exhibit strong absorption in the UV region, which is very advantageous in varnish systems since typical UV protective pigments, such as, for example, $TiO_2$ pigments, are lacking here in high concentrations. Additional UV protection is therefore particularly desired in varnish systems.

The nanoparticulate semiconductor materials according to the invention generally have, as primary particles, mean particle sizes ($d_{50}$) of from 10 to 80 nm, preferably from 20 to 50 nm, in particular from 20 to 30 nm.

In the case of semiconductors having a homogeneous structure, the semiconductor material preferably has a microcrystalline structure.

Particularly preferred hardening accelerators are transparent or pale semiconductor materials having a powder resistance of <20 Ω·m, preferably <5 Ω·m.

A particularly preferred hardening accelerator is tin(IV) oxide doped with antimony(III) oxide. Preference is furthermore given to addition of indium oxides as dopant.

Besides antimony(III), preferably antimony(III) oxide, suitable dopants, in particular for tin oxides, are halides, preferably chlorides and fluorides.

The doping is dependent on the semiconductor material employed and is generally 0.5-30% by weight, preferably 2-25% by weight, in particular 5-16% by weight, based on the semiconductor material.

Tin oxides are preferably doped with 0.5-30% by weight, in particular 1-12% by weight and very particularly preferably with 5-10% by weight. The dopants employed are preferably antimony or antimony compounds.

It is furthermore also possible to employ mixtures of nanoparticulate semiconductor materials as hardening accelerator, in particular of polymer matrices, such as surface coatings and printing inks, where the mixing ratio is unlimited.

Preferred mixtures are indium tin oxides with doped tin (IV) oxides and indium tin oxide with doped zinc oxides. In a particular embodiment, the nanoparticles according to the invention can furthermore also be mixed with flake-form hardening accelerators, such as, for example, Minatec® 30 or Minatec® 31, products from Merck KGaA. The latter preferably have particle sizes of 5-100 µm. This mixture of nanoparticles/flakes preferably comprises 2-98% by weight, in particular 50-98% by weight and very particularly preferably 80-98% by weight, of the nanoparticulate semiconductor materials according to the invention. Such mixtures of flake-form hardening accelerators which ensure excellent surface coverage, preferably highly transparent in the visible light region, with the nanoparticles according to the invention, which additionally have good thermal conductivity and ensure strong IR absorption and thermal conduction within the matrix volume, are advantageous for all polymer matrices known to the person skilled in the art.

It is also possible to add mixtures of two, three or more nanoparticulate semiconductor materials to the use systems. The total concentration is dependent on the use system. For example, the total concentration of semiconductor material mixture should not be more than 10% by weight, based on the use system, in the surface-coating system or in the printing ink.

The hardening accelerator(s) is(are) preferably added to the surface-coating system or printing ink in amounts of 0.01-10.0% by weight, in particular 0.01-8.0% by weight, particularly preferably in amounts of 0.05-5.0% by weight, based on the surface coating or printing ink.

The nanoparticulate semiconductor materials according to the invention are prepared by grinding a suitable precursor having particle sizes in the range from 0.1 to 50 µm, preferably from 0.5 to 10 µm, in particular from 1 to 10 µm, in water or an aqueous solvent mixture. Suitable precursors are, in particular, doped or undoped, pale or transparent semiconductor materials, in particular indium oxide, tin, tin oxide, antimony and mixtures thereof. Very particular preference is given to tin oxide, in particular antimony-doped tin oxide. Suitable precursors are commercially available, for example from Merck KGaA under the trade name Minatec®230.

The precursors are preferably ground in water. However, it is also possible to employ mixtures of water and organic solvents which are readily soluble in water. Suitable organic solvents are, in particular, alcohols, such as, for example, ethanol, propanol, butanol, cyclohexanol, glycols, such as, for example, ethylene glycol or propylene glycol.

Suitable mills are ball mills, bead mills, and other suitable grinding units known to the person skilled in the art which allow intensive dissipation of the resultant heat and also a high degree of filling of grinding media and furthermore considerable input of mechanical energy.

During the grinding, the pH is set to 6-11, preferably pH 8-11. The pH is dependent on the precursor used and can easily be determined by the person skilled in the art. The grinding process takes from 2 to 48 h, preferably from 10 to 24 h, depending on the precursor employed.

This can be followed by a drying process. If necessary, the nanoparticles are centrifuged off and subsequently dried at temperatures of 40-130° C., in particular 50-80° C., preferably using reduced pressure.

The grinding is preferably carried out at concentrations of the precursor material of from 5 to 20%, particularly preferably at concentrations of the precursor material of from 10 to 20%, depending on the viscosity of the nanoparticle dispersion formed. Furthermore, the highest possible degree of filling of hard, finely divided grinding media should be aimed at.

Nanoparticulate doped tin oxides are preferably prepared by subjecting coarsely particulate precursors having particle sizes in the range from 0.1 to 50 µm, in particular from 1 to 10 µm, at a pH of 9-11, to intensive grinding, preferably using zirconium oxide grinding media or grinding media of comparable or greater hardness.

The IR hardening accelerator according to the invention, alone or in combination with flake-form hardening accelerators, is stirred in before application to an article, for example a surface coating or printing ink. This is preferably carried out using a high-speed stirrer or, in the case of mechanically insensitive hardening accelerators which are difficult to disperse, through the use of a bead mill or shaking machine. Other dispersion units known to the person skilled in the art are also possible. Finally, the surface coating or printing ink is hardened physically in air using IR irradiation or chemically crosslinked.

The hardening accelerator very considerably shortens the hardening time of the surface-coating layer or printing ink or makes the use of IR drying in transparent surface-coating systems, such as, for example, powder coatings, possible economically at all, since they, as organic compounds, hardly absorb at all in the near, high-energy infrared region. The more efficient action is readily evident from the essentially forced temperature change on IR irradiation of a transparent polymer layer which comprises nanoparticles according to the invention compared with the corresponding sample without the particles according to the invention.

The nanoparticulate IR hardening accelerators according to the invention are therefore particularly suitable for IR varnishes of all types owing to their transparency.

It has furthermore been found that the hardening acceleration can also have a positive effect on overlying IR coating layers, depending on the pigmentation of these overlying coating layers and the heat influences.

The invention furthermore relates to polymer matrices, such as, for example, printing inks, industrial coatings and automobile paints, including varnishes, which comprise the nanoparticulate IR hardening accelerators according to the invention.

Suitable surface-coating systems include, in particular, IR-hardenable surface coatings from the area of powder coatings, and solvent-based systems. Also suitable are film applications and plastic welding, as well as solvent-containing or water-borne IR printing inks for all common types of printing, such as, for example, gravure printing, flexographic printing, letterpress printing, textile printing, offset printing, screen printing and security printing.

The following examples are intended to explain the invention in greater detail, but without restricting it.

BRIEF DESCRIPTION OF THE DRAWINGS

FIG. 1 shows a comparison of the absorption of varnishes (V) prepared with different nanoparticles (035%).

FIG. 2 shows the heating behavior of the various powder coating according to Example 4 under the influence of IR irradiation.

EXAMPLES

Example 1

Preparation of Nanoparticulate Antimony-Doped Tin Oxide

For the preparation of antimony-doped nanoparticulate tin oxide, about 13 percent by weight of the precursor with a size of approximately 1-10 μm (Minatec® 230 from Merck KGaA) are introduced into a stirred ball mill, zirconium oxide grinding media having a diameter of 0.35 mm (degree of filling φ=0.8) are added, and grinding is carried out for 24 hours at pH 11. The $d_{50}$ value of the particle size is about 50 nm.

Example 2

Preparation of Transparent IR-Absorbent Polymer Matrices 0.5% of each of nanoparticulate zinc oxide, tin oxide and the antimony-doped tin oxide nanoparticles from Example 1 are added to a clear hydro-coating, which is applied to a metal substrate at constant layer thickness. The change in the surface and substrate temperature as a function of time on irradiation with an IR source is measured.

Table 1 shows that the most forced heat change ($T_{max}$, measured after irradiation for 20 sec) is obtained for the varnish comprising the nanoparticles according to the invention. However, the colour differences (ΔE) for the varnish system are very slight compared with nanoparticulate tin oxide or zinc oxide. Since the particles according to the invention are nanoparticulate materials with a $d_{50}$ of 50 nm with low absorption (FIG. 1), they furthermore exhibit high transparency.

TABLE 1

| Composition | $T_{max}$ | ΔE compared with varnish over white measured | ΔT compared with room temperature |
| --- | --- | --- | --- |
| Varnish | 50.3 | 0 | 28.3 |
| Nanoparticles according to Example 1 | 58.0 | 0.143 | 36.0 |
| ZnO | 54.0 | 0.164 | 32.0 |
| $SnO_2$ | 51.0 | 0.211 | 29.0 |

Example 3

Preparation of a Powder Varnish Masterbatch

Crylcoat® 633 (Cytec, West Paterson, USA) is added to 5% of the nanoparticulate antimony-doped zinc oxide (based on the solids content) from Example 1, and the mixture is pre-dried for 2 h at 25° C. and 50 mbar. During subsequent extrusion, the residual water is separated off via the degassing. A transparent powder coating masterbatch is obtained which comprises the nanoparticulate antimony-doped zinc oxide according to the invention in finely disperse state.

Example 4

Production and Comparison of Colour-Neutral, IR-Absorbent Powder Coating Systems with the Highest Possible Transparency The heating behaviour is tested after electrostatic powder coating application to aluminium sheeting. To this end, the surface temperature is measured during irradiation with an IR source. The following 3 samples are compared with one another:

Powder Coating Sample 1: Preparation of an Antimony-Doped Zinc Oxide Powder Varnish Comprising Nanoparticulate Antimony-Doped Zinc Oxide 4% by weight of masterbatch according to Example 3, 4.4% by weight of Primid XL 552 (EMS-PRIMID, Doma/Ems, Switzerland) and 0.5% by weight of benzoin (Merck KGaA, Darmstadt, Germany) are incorporated into 91.1% by weight of Crylcoat®633 (Cytec, West Paterson, USA) by joint extrusion using a Buss compounder (TCS 30) at 110° C. and 300 rpm (corresponds to a content of 0.2% by weight of nanoparticles from Example 1 according to the invention in the powder coating).

Powder Coating Sample 2: Comparative Sample Pigmented with Precursor Minatec® 230

0.2% by weight of Minatec® 230 (Merck KGaA, Darmstadt, Germany), 4.4% by weight of Primid XL 552 (EMS-PRIMID, Doma/Ems, Switzerland) and 0.5% by weight of benzoin (Merck KGaA, Darmstadt, Germany) are incorporated into 94.9% by weight of Crylcoat® 633 (Cytec, West Paterson, USA) analogously to powder coating sample 1.

Powder Coating Sample 3: Comparative Sample of Unpigmented Powder Varnish 4.4% by weight of Primid XL 552 (EMS-PRIMID, Doma/Ems, Switzerland) and 0.5% by weight of benzoin (Merck KGaA, Darmstadt, Germany) are incorporated into 95.1% by weight of Crylcoat® 633 (Cytec, West Paterson, USA) analogously to powder coating samples 1 and 2.

It can be seen from FIG. 2 that the powder varnish comprising the nanoparticle preparation according to Example 3 according to the invention achieves the fastest and greatest heating. A significantly worse temperature change is shown by powder coating sample 2 pigmented with the precursor Minatec® 230, which may also be regarded as visually not completely transparent. The unpigmented powder varnish exhibits a very slow temperature change. Furthermore, it is observed that only powder coating sample 1 achieves the high temperatures necessary for complete crosslinking through IR irradiation.

The invention claimed is:

1. A method of accelerating IR hardening of material selected from solid and liquid preparations, matrix polymers, polymer preparations, industrial coatings, automobile paints, varnish systems, powder coatings, plastics and films, said method comprising:

grinding semiconductor materials, having a particle size of from 0.1 to 50 μm, in an aqueous medium at a pH of 6-11 to form nanoparticulate semiconductor materials which have, as primary particles, a mean particle size ($d_{50}$) of from 10 to 80 nm, wherein said nanoparticulate semiconductor materials are transparent or pale semiconductor materials having a powder resistance of <20 Ω·m and are selected from indium(III) oxide, indium tin oxide (ITO), antimony(III) oxide, tin(IV) oxide, zinc oxide, and mixtures thereof;

adding said nanoparticulate semiconductor materials to said material as an IR hardening accelerator; and hardening said material by subjecting said material to IR irradiation.

2. The method according to claim 1, wherein said nanoparticulate semiconductor materials are doped with antimony (III) or halides.

3. The method according to claim 2, wherein the nanoparticulate semiconductor material is an antimony(III) oxide-doped tin(IV) oxide.

4. The method according to claim 2, wherein the doping amount is 0.5-30% by weight, based on the semiconductor material.

5. The method according to claim 1, wherein the semiconductor material has a microcrystalline structure.

6. The method according to claim 1, wherein said material is a surface coating or printing ink comprising 0.01-10% by weight of said nanoparticulate semiconductor materials, based on the surface coating or printing ink, as IR hardening accelerators.

7. The method according to claim 1, wherein said material is a polymer masterbatch or polymer preparation comprising 1-30% by weight of said nanoparticulate semiconductor materials, based on the polymer masterbatch or polymer preparation.

8. The method according to claim 1, wherein said material is a solid or liquid preparation comprising one or more said nanoparticulate semiconductor materials, one or more additives, and optionally water or a water/solvent mixture.

9. The method according to claim 1, wherein said nanoparticulate semiconductor materials are transparent or pale semiconductor materials having a powder resistance of <5 Ω·m.

10. The method according to claim 1, wherein said nanoparticulate semiconductor materials are selected from tin(IV) oxide, indium tin oxide (ITO), antimony(III) oxide, and mixtures thereof.

11. The method according to claim 1, wherein said nanoparticulate semiconductor materials have, as primary particles, a mean particle size ($d_{50}$) of from 20 to 50 nm.

12. The method according to claim 1, wherein said nanoparticulate semiconductor materials have, as primary particles, a mean particle size ($d_{50}$) of from 20 to 30 nm.

13. The method according to claim 4, wherein the doping amount is 2-25% by weight, based on the semiconductor material.

14. The method according to claim 4, wherein the doping amount is 5-16% by weight, based on the semiconductor material.

15. The method according to claim 1, wherein during said grinding of semiconductor materials in an aqueous medium at a pH of 6-11, said semiconductor materials have a particle size of from 0.5 to 10 μm.

16. The method according to claim 1, wherein during said grinding of semiconductor materials in an aqueous medium at a pH of 6-11, said semiconductor materials have a particle size of from 1 to 10 μm.

17. The method according to claim 1, wherein, during said grinding, said semiconductor materials are ground in said aqueous medium at a pH of 8-11.

18. The method according to claim 15, wherein said nanoparticulate semiconductor materials are prepared by grinding semiconductor materials in an aqueous medium at a pH of 8-11.

19. The method according to claim 1, wherein said nanoparticulate semiconductor materials in aqueous media have a zeta potential of ≥30 mV.

20. The method according to claim 1, wherein said nanoparticulate semiconductor materials in aqueous media have a zeta potential of ≥60 mV.

21. The method according to claim 1, wherein said nanoparticulate semiconductor materials are selected from indium (III) oxide, antimony(III) oxide, tin(IV) oxide, zinc oxide, and mixtures thereof.

22. The method according to claim 2, wherein the nanoparticulate semiconductor material is antimony-doped zinc oxide.

23. The method according to claim 6, wherein said material is a surface coating or printing ink comprising 0.01-8.0% by weight of said nanoparticulate semiconductor materials, based on the surface coating or printing ink, as IR hardening accelerators.

24. The method according to claim 6, wherein said material is a surface coating or printing ink comprising 0.05-5.0% by weight of said nanoparticulate semiconductor materials, based on the surface coating or printing ink, as IR hardening accelerators.

25. The method according to claim 1, further comprising adding flake-form hardening accelerators to said material.

26. The method according to claim 25, wherein the resultant mixture of nanoparticles semiconductor materials and flake-form hardening accelerators contains 2-98% by weight of the nanoparticulate semiconductor materials.

* * * * *